United States Patent Office 3,444,268
Patented May 13, 1969

3,444,268
POLYBLENDS COMPRISING A VINYL CHLORIDE GRAFT COPOLYMER, BUTADIENE-ACRYLONITRILE COPOLYMER, AND A VINYL POLYMER
Ludwig A. Beer, Agawam, Mass., assignor to Monsanto Company, St. Louis, Mo., a corporation of Delaware
No Drawing. Filed Aug. 23, 1965, Ser. No. 481,905
Int. Cl. C08f 37/18
U.S. Cl. 260—876          7 Claims

ABSTRACT OF THE DISCLOSURE

Three-component blends comprising vinyl chloride polymer, vinyl halide graft copolymer, and butadiene-acrylonitrile copolymer. Such blends have improved strength and clarity.

---

This invention relates to polyblend resins of the vinyl halide type having improved physical characteristics.

Vinyl halide resins such as vinyl chloride, vinylidene chloride and the like have been found suitable when present in the appropriate proportions for the manufacture of rigid articles such as bottles, sheets, film, pipe, gutter spouts, siding and numerous other structural articles. Specific emphasis for these products is being placed in the field of blown bottleware, and structural products such as house siding, rain gutters and the like.

Polyvinyl chloride homopolymer is generally not acceptable for structural applications mainly due to its low impact strength, but is highly touted for its inertness to the action of other chemicals. In rigid structural materials such as those set forth, good physical properties are critical to the success of the structural articles. Vinyl compounds are especially suited for structural usage because of good weathering properties, but as stated above, polyvinyl chloride, per se is physically deficient due to low impact strength. Numerous attempts have been made to improve the physical characteristics of vinyl halide resin compositions to render them suitable for plastic bottles, films, sheets, and other structurally oriented articles. Substantial emphasis has been placed on the development of a vinyl compound having good impact strength, clarity and weatherability. To date, no solution has been conceived for simultaneously acquiring optimum results for each of these properties, but much has been done to optimize the combination. In other words, where one composition excels in impact strength, its weatherability and/or clarity are deficient.

One development in rigid plastics is physical mixtures of vinyl chloride polymers or copolymers of vinyl chloride monomers and other ethylenically unsaturated monomers with chlorinated olefins such as chlorinated polyethylene. Exemplary of such a mixture is the Frey et al. patent, 3,006,889, which teaches physical mixtures of polyvinyl chloride and copolymers thereof with chlorinated polyethylene within certain proportions. Similarly, the Hankey et al. patent, 3,145,187, teaches the addition of a surfactant to polyvinyl chloride-chlorinated polyethylene physical mixtures in the composition ranges where the chlorinated polyethylene is incompatible with polyvinyl chloride.

Paralleling the physical mixtures of polyvinyl chloride and other components, polymerization of the vinyl chloride monomer or vinyl monomer in the presence of chlorinated polyethylene or other polymers or copolymers have been shown to provide graft polymer compositions having superior physical characteristics to those of the corresponding physical mixtures. In any event, both the physical mixtures and the graft polymers do improve the physical characteristics of the composition over that polyvinyl chloride, per se. Accordingly, these compositions have been deemed somewhat suitable for applications similar to those for which the present invention is directed.

Further attempts have been made to improve the physical characteristics of the resinous compositions by providing physical mixtures of polyvinyl chloride and/or copolymers with various graft polymerization end products. Exemplary achievements are the Hayes patent, 2,802,809, the Heaps et al. patent, 3,167,598 and the Fedderson patent, 2,889,308. Still further, Patent 3,053,800 to Grabowski teaches blends of polyvinyl chloride and acrylonitrile, butadiene, styrene graft copolymers and copolymers of acrylonitrile styrene and alpha methyl styrene.

All of the above patents contain teachings of specific resinous compositions characteristic of having improved physical characteristics over those of polyvinyl chloride, per se, and all of which are somewhat useful in application for the production of structural plastic items. These compositions afford improved impact strength, tensile strength and heat stability to the final product made from the composition. Noteworthy, however, is the fact that while blends of polyvinyl chloride homopolymer or vinyl chloride copolymers with graft copolymers such as polyvinyl chloride-chlorinated polyethylene provide compositions of enhanced impact strength, they are somewhat deficient in light transmittance.

It is, therefore, an object of this invention to provide a vinyl halide composition that has enhanced impact strength and clarity.

Another object of this invention is to provide a superior vinyl halide composition suitable for blown bottleware.

Still another object of this invention is to provide a vinyl halide composition that is suitable for formation of structural products designed for outside use.

These and other objects will become more apparent from the following detailed discussion of the present invention.

The present invention is yet a further step in the development of rigid vinyl halide compositions having mainly improved impact strength, weatherability and clarity. The resinous compositions of the present invention are suitable for extrusion, calendering, injection molding, blow molding, vacuum forming, or compression molding to produce items such as pipe, gutter spouts, siding, plastic bottles, films, sheets, as well as numerous other shaped plastic articles.

The present invention is generally directed to a novel blend of (A) a graft copolymer resin obtained by polymerizing vinyl chloride alone or mixed with a suitable monomer copolymerizable therewith in the presence of an ethylene polymer; (B) a copolymer of butadiene and acrylonitrile; and (C) a polymer having incorporated therein at least 70 percent vinyl chloride.

Constituent (A) is a graft copolymer prepared by polymerizing vinyl chloride monomer or a mixture of co-monomers including at least 50 percent vinyl chloride and a monomer copolymerizable therewith in the presence of 4 to 20 percent of an ethylene polymer of the type described below.

Numerous monomers are suitably copolymerizable with vinyl chloride in the preparation of the constituents (A) or (C). While the group from which these monomers is obtained is not so specifically limited, vinyl acetate, vinyl laurate, alkyl acrylates, alkyl methacrylates, alkyl maleates, alkyl fumarates, vinylidene chloride, acrylonitrile, vinyl cetyl ether, vinyl lauryl ether and vinyl myristyl ether are suitable.

The ethylene polymer or backbone polymer, in the preparation of constituent (A) is generally a chlorinated ethylene polymer but is not so limited. Both chlorinated high and low density polyethylenes are suitable. Further, the chlorinated polyethylene may have been homogeneously chlorinated in the dry, dispersed or dissolved state, and additionally may have been chlorinated in the presence or absence of solvents or swelling agents. The chlorination reaction may be activated by heat, light, or free radical initiators. The chlorinated polyethylene may also be crosslinked or uncrosslinked and the compounds preferably contain a chlorine content in the range of 20–45% by weight.

A second suitable ethylene polymer is a copolymer of ethylene and propylene that is chlorinated in the same way as the polyethylene. The chlorinated copolymer of ethylene and propylene also preferably contains 20–45% by weight of chlorine.

A copolymer of ethylene and vinyl acetate is a further trunk polymer onto which the polyvinyl chloride or copolymers thereof may be grafted. The ethylene/vinyl acetate copolymer may be uncrosslinked or slightly crosslinked and preferably contains vinyl acetate in the range of 30–75% by weight.

A copolymer of ethylene and vinyl chloride is another example of a suitable backbone polymer for the preparation of constituent (A). The ethylene/vinyl chloride copolymers may be uncrosslinked or slightly crosslinked and preferably should contain from about 30–75% by weight of vinyl chloride.

Still further, another example of a suitable ethylene trunk polymer is a copolymer of ethylene and ethyl acrylate preferably having an ethyl acrylate content of 20–65% by weight.

The copolymer of constituent (B) is prepared by polymerizing monomer mixtures of butadiene and acrylonitrile in respective ratios of from about 95:5 to about 70:30. The polymerization may be initiated by a potassium persulfate catalyst for example at temperatures ranging from about 25 to above 80° C. Furthermore, divinyl benzene or any other suitable cross linking agent may be added when cross linking is desired.

Constituent (C) may be vinyl chloride homopolymer or a vinyl chloride copolymer of at least 70 percent vinyl chloride and some other monomer copolymerizable therewith. Suitable comonomers include, but are not limited to, vinyl acetate, vinyl laurate, alkyl acrylates, alkyl methacrylates, alkyl maleates, alkyl fumarates, vinylidene chloride, acrylonitrile, vinyl cetyl ether, vinyl lauryl ether and vinyl myristyl ether.

While very broad ranges of mixtures of constituents (A), (B) and (C) provide improved polyvinyl chloride compositions, the preferred ranges reside in the area wherein the sum of constituent (A) and (C) ranges from about 89 to about 97% by weight of the total compositions and where the sum of constituents (A) and (B) represent from about 50 to about 100% by weight of the total compositions. Furthermore, individual preferred ranges of the various constituents include (A) in the range of from about 40 to about 97%; (B) from about 3 to about 20% and (C) from about 0 to about 57% by weight of the total compositions.

The polyvinyl chloride graft copolymers of constituent (A) may be prepared as described in copending application Ser. No. 204,031 filed June 21, 1962 now U.S. Pat. No. 3,268,623. Such process teaches the polymerization of a vinyl chloride monomer in the presence of varying amounts of chlorinated polyethylene preferably in aqueous suspension wherein the reaction was initiated by a peroxidic initiate. Chlorinated polyethylene is substantially dissolved in the vinyl chloride monomer, lauroyl peroxide is added and the polymerization allowed to proceed at temperatures of 25–80° C., and preferably 45–65° C., until a pressure drop indicates at least 80% monomer conversion.

For a better understanding of the present invention, the following examples and comparative tables are included. These examples are not to be construed as limiting the present invention, but are only evidence of the results obtained by practice of the present invention and are indicative of operating conditions under which the compositions of the present invention are prepared. Unless otherwise indicated, parts are by weight.

EXAMPLE I 100 parts of a polyvinyl chloride graft copolymer resin was obtained by polymerizing vinyl chloride monomer in the presence of 10 parts of chlorinated polyethylene (24% chlorine, intrinsic viscosity of 0.78). The reaction proceeded at 57° C. using a lauroyl peroxide catalyst and yielded a polymer having a specific viscosity of 0.43 (0.42% solution in cyclohexanone at 25° C.). Two parts of a tin mercaptide and 0.5 part of a paraffin wax lubricant were then added to the graft resin and the mixture was milled on a two-roll mill at 170° C. After 10 minutes of milling, a ⅛ inch thick sheet was drawn off and test samples measuring 5 inches x ½ inch x ⅛ inch were prepared from the milled sheet and tested for impact strength as per ASTM D–256–56. A 25 mil thick, press-polish sheet was used for determination of haziness on a General Electric spectrophotometer by light transmittance at 550 millimicrons wavelength (ASTM D–1003–52).

The aforedescribed samples were analyzed and the data set forth in Table 1.

EXAMPLE II

A butadiene-acrylonitrile copolymer having a respective ratio of 70:30 was prepared according to the aforedescribed copolymerization process. This particular copolymer had a specific gravity of 0.98; a Mooney plasticity of 102 and was 30 percent soluble in methyl ethyl ketone. A physical mixture was prepared from 50 parts of the graft copolymer prepared in Example I, 5 parts of the above butadiene-acrylonitrile copolymer and 45 parts of a polyvinyl chloride homopolymer suspension resin having a specific viscosity of 0.39. The mixture was intimately fuse blended on a two-roll mill and samples prepared as described in Example I. Results of analysis of the samples are recorded in Table I. This composition is a teaching of the present invention.

EXAMPLE III

A mechanical blend was prepared from 90 parts of polyvinyl chloride homopolymer and 10 parts of the butadiene-acrylonitrile copolymer of Example II. This mixture was intimately fused on a two-roll mill and samples prepared as prescribed in Example I. Results of analyses of the samples appear in Table I.

EXAMPLE IV

A graft copolymer resin was prepared by polymerizing 90 parts of vinyl chloride monomer in the presence of 10 parts of chlorinated polyethylene (31.6 percent chlorine) in aqueous suspension. The polymerization was carried out at 50° C. and was initiated by a diisopropyl percarbonate catalyst. The graft copolymer had a specific viscosity of 0.56 (0.42 percent solution in cyclohexane). Milling and sample preparation were conducted as prescribed in Example I. Results of analyses of the samples appear in Table I.

EXAMPLE V

A physical mixture was prepared from 50 parts of the polyvinyl chloride-chlorinated polyethylene graft copolymer of Example IV; 45 parts of a copolymer of vinyl chloride and vinyl cetyl ether in ratio respectively of 96:4 and having a specific viscosity of 0.29; and 5 parts of a butadiene-acrylonitrile copolymer as prepared in Example II but having a respective ratio of 75:25; a specific gravity of 0.95 and a Mooney plasticity of 82. The physical mixture was compounded and samples prepared as described in Example I. Results of analyses appear in Table I. This composition is a teaching of the present invention.

EXAMPLE VI

A physical mixture was prepared from 90 parts of a polyvinyl chloride homopolymer having a specific viscosity of 0.43 and 10 parts of the butadiene-acrylonitrile copolymer described in Example V. This mixture was then blended and samples prepared as per the procedure set forth in Example I. Results of the analyses of these samples may be compared to the other collected data in Table I.

EXAMPLE VII

A graft copolymer was prepared by polymerizing 90 parts of vinyl chloride monomer in aqueous suspension at 50° C. in the presence of 10 parts of a copolymer of ethylene and vinyl chloride (45.6:54.4), said copolymer having a specific viscosity of 0.13 at 25° C. as a 0.1 percent solution in tetrahydrofurane. The polymerization reaction was initiated with acetyl cyclohexane persulfonate. The graft copolymer produced was milled and samples prepared as per the directions of Example I. Results of analyses are tabulated in Table I.

EXAMPLE VIII

A rubbery copolymer of butadiene and acrylonitrile having a ratio of 90:10 was prepared according to the procedures of Example II. The copolymer had a Mooney plasticity of 75 and was 65 percent soluble in methyl ethyl ketone. A physical mixture was prepared from 5 parts of this butadiene-acrylonitrile rubbery copolymer; 70 parts of the polyvinyl chloride-ethylene-vinyl chloride graft copolymer of Example VII and 25 parts of a copolymer of vinyl chloride and acrylonitrile in a ratio of 97 to 3. The physical mixture was blended on a two-roll mill and samples prepared from the blend as per the procedures set forth in Example I. Results of analyses of these samples appear in Table I. This composition is a teaching of the present invention.

EXAMPLE IX

A physical mixture was prepared from 90 parts of vinyl chloride homopolymer and 10 parts of the butadiene-acrylonitrile copolymer of Example VIII. This mixture was blended and sampled by the same methods described in Example I. Results of analyses of the samples appear in Table I.

TABLE I

| Examples | I | II | III | IV | V | VI | VII | VIII | IX |
|---|---|---|---|---|---|---|---|---|---|
| Milled sheet izod impact, ft./lb./in. (ASTM D-256-56) | 18.6 | 15.0 | 0.6 | 9.6 | 14.5 | 2.9 | 4.8 | 14.5 | 2.3 |
| Percent haze by transmittance at 550 mm. (ASTM D-1003-52) | 26.2 | 8.6 | 4.2 | 18.2 | 8.1 | 8.2 | 9.7 | 7.2 | 9.8 |

Examples II, V and VIII are teachings of the present invention. As stated before, emphasis has been placed on achieving a rigid vinyl composition having both excellent impact strength and clarity. These two physical attributes are necessary for employing the composition successfully as a bottle blowing resin. A review of Table I reveals that none of the compositions analyzed other than II, V and VIII had both high impact strength and good clarity (low percent haze). Instances occur where an equally high impact strength or equally good clarity are found, but in these instances, one of the criteria was found deficient.

The compositions of the present invention are equally suitable for extruding or injection molding rigid structures designed for outside exposure. Such structures include rain gutters, catch pots and the like. Since extreme clarity is not required for these uses, a pigment is commonly added. It is therefore quite foreseeable that pigments, lubricants and/or processing aids will be added to the compositions of the present invention.

It is further anticipated that others skilled in the art will find numerous modifications well within the scope of the present invention. Hence, the above description should not be limiting, but should only serve as guide lines for those skilled in the art and the true scope of the present invention should be governed by the appended claims.

What is claimed is:

1. A heat fusible three component vinyl halide type blend having improved impact strength and clarity consisting essentially of:
   (a) from about 40 to 97 weight percent of a vinyl halide graft copolymer prepared by polymerizing a mixture of:
      (1) a vinyl halide monomer, and
      (2) an ethylene polymer selected from the group consisting of chlorinated polyethylene having a chlorine content of from about 20 to 45 weight percent, chlorinated copolymers of ethylene and propylene having a chlorine content of from about 20 to 45 weight percent, copolymers of ethylene and vinyl acetate containing from about 30 to 75 weight percent vinyl acetate, copolymers of ethylene and vinyl chlorine containing from about 30 to 75 weight percent vinyl chloride, and copolymers of ethylene and ethyl acrylate containing from about 20 to 65 weight percent ethyl acrylate,
      (3) said ethylene polymer comprising from about 4 to 20 weight percent of said mixture,
   (b) from about 3 to 20 weight percent of a butadiene-acrylonitrile copolymer prepared by polymerizing a monomer mixture of butadiene and acrylonitrile wherein the ratio of butadiene to acrylonitrile ranges from about 95:5 to 70:30.
   (c) up to about 57 weight percent of a copolymer prepared from about 70 to 97 weight percent of vinyl chloride monomer with the balance up to 100 weight percent of such a copolymer being other monomers copolymerizable therewith,
   (d) the combined weight of said vinyl halide graft copolymer and said vinyl chloride polymer ranging from about 80 to 97 weight percent of a given blend, and
   (e) the combined weight of said vinyl halide graft copolymer and said butadiene-acrylonitrile copolymer being at least about 43 weight percent.

2. A blow molded container formed from the blend of claim 1.

3. A blow molded article having a composition as defined in claim 1.

4. An extruded article having a composition as defined in claim 1.

5. An injection molded article having a composition as defined in claim 1.

6. A rigid vinyl chloride fused blend comprising:
   (A) 50 parts of a graft copolymer prepared by polymerizing 90 parts of vinyl chloride monomer in the presence of 10 parts of chlorinated polyethylene;
   (B) 5 parts of a butadiene-acrylonitrile copolymer having a butadiene:acrylonitrile ratio of about 75:25; and
   (C) 45 parts of a copolymer of vinyl chloride and vinyl cetyl ether having a vinyl chloride:vinyl cetyl ether in a ratio of about 96:4.

7. A rigid vinyl chloride fused blend comprising:
   (A) 70 parts of a graft copolymer prepared by polymerizing 90 parts of vinyl chloride monomer in the presence of 10 parts of an ethylene-vinyl chloride copolymer;
(B) 5 parts of a butadiene-acrylonitrile copolymer having a butadiene:acrylonitrile ratio of about 95:5; and
(C) 25 parts of a copolymer of vinyl chloride and acrylonitrile having a vinyl chloride:acrylonitrile ratio of about 97:3.

References Cited

UNITED STATES PATENTS

| | | | |
|---|---|---|---|
| 3,085,082 | 4/1963 | Baer et al. | 260—876 XR |
| 3,112,290 | 11/1963 | Salyer | 260—878 |
| 3,322,857 | 5/1967 | Coaker et al. | 260—876 |
| 3,322,858 | 5/1967 | Coaker et al. | 260—876 |

FOREIGN PATENTS 1,381,031  10/1964  France.

GEORGE F. LESMES, *Primary Examiner.*

U.S. Cl. X.R.

260—878